(No Model.) 2 Sheets—Sheet 1.
T. T. JORDAN.
WAGON WHEEL.
No. 597,647. Patented Jan. 18, 1898.
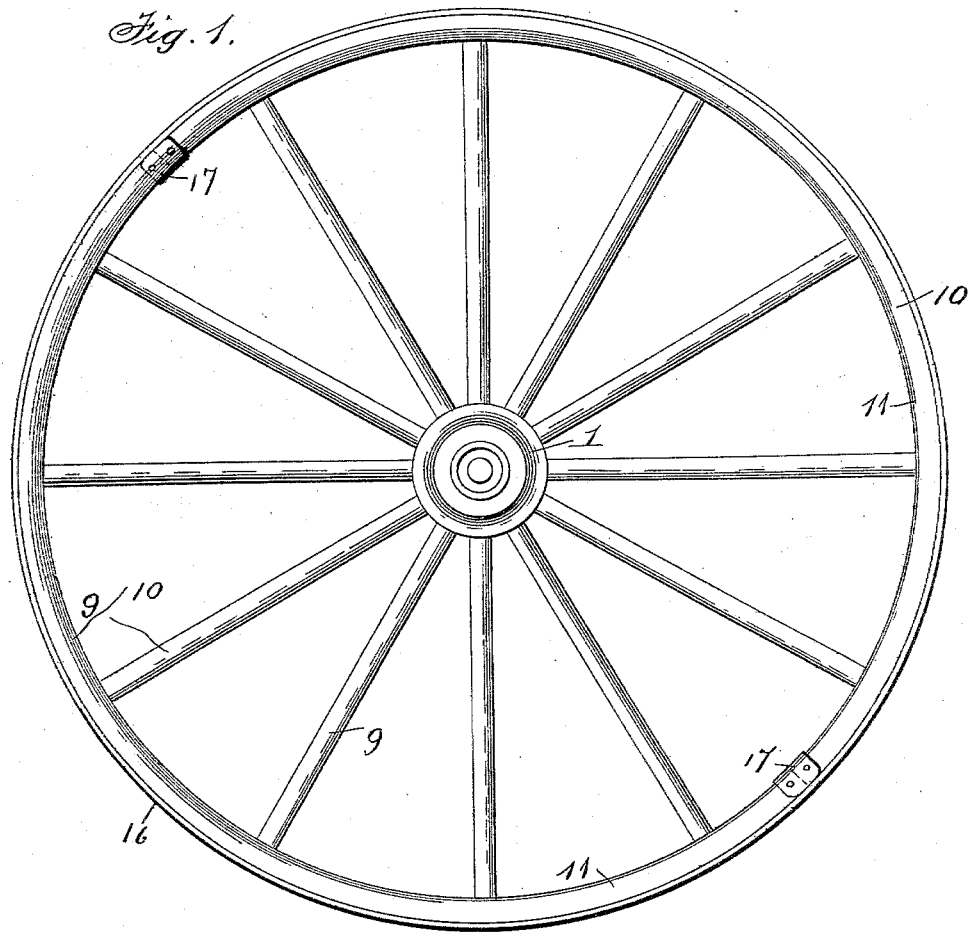
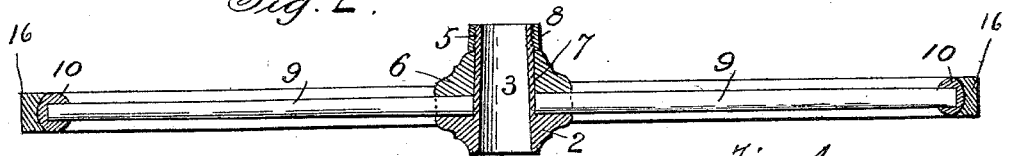
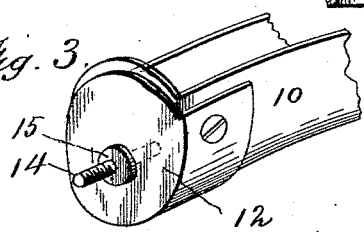
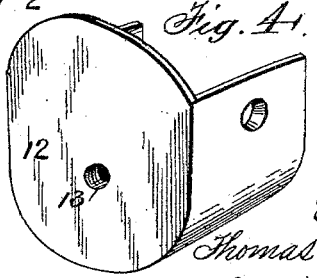
Witnesses
F. L. Ourand
E. M. Mason
Inventor
Thomas T. Jordan.
By John Wedderburn
Attorney (No Model.) 2 Sheets—Sheet 2.
T. T. JORDAN.
WAGON WHEEL.
No. 597,647. Patented Jan. 18, 1898.
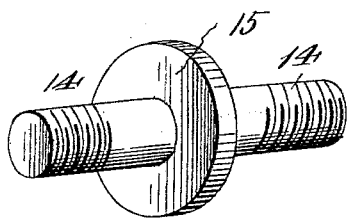
Fig. 5.
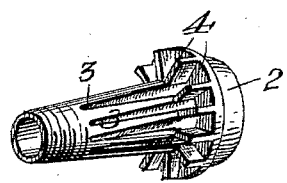
Fig. 6.
Fig. 8.
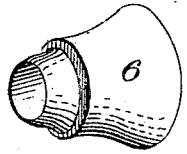
Fig. 7.
Fig. 9.
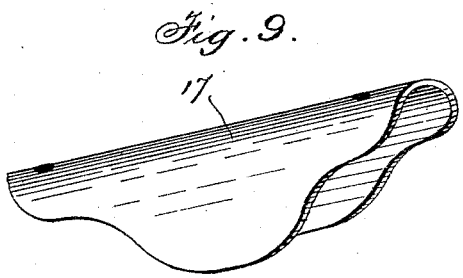
Witnesses
H. L. Ourand.
M. Mason.
Inventor
Thomas T. Jordan.
by John Wedderburn
Attorney

UNITED STATES PATENT OFFICE.

THOMAS T. JORDAN, OF WILCOX, NEBRASKA.

WAGON-WHEEL.

SPECIFICATION forming part of Letters Patent No. 597,647, dated January 18, 1898.

Application filed August 13, 1896. Serial No. 602,655. (No model.)

*To all whom it may concern:*

Be it known that I, THOMAS T. JORDAN, a citizen of the United States, residing at Wilcox, in the county of Kearney and State of Nebraska, have invented certain new and useful Improvements in Wagon-Wheels; and I do hereby declare the following to be a full, clear, and exact description of the invention, such as will enable others skilled in the art to which it appertains to make and use the same.

My invention relates to certain new and useful improvements in wheels, the invention residing particularly in the construction of the hub, the felly, and the tire, whereby the tire is held in place by an expansion of the parts of the felly instead of by shrinking the tire thereon, as is now the general custom.

The invention consists of a hub made up of three parts, one of said parts having a tapering cone-shaped mandrel thereon, with longitudinal grooves in its outer surface and screw-threads upon its outer end, another of said parts having a central opening therethrough and adapted to fit upon said mandrel, and a third a point-band or collar having internal screw-threads therein adapted to fit upon the outer end of said mandrel and engage the screw-threads thereof, a felly made in two or more parts having a convex outer surface with caps fitting upon the ends of said parts, having screw-threaded openings therein, tire-setting bolts having right and left hand screw-threads upon their opposite ends adapted to engage the threaded portions of said caps and provided with central heads by means of which they may be turned, and a tire adapted to fit upon said felly and provided with a concave inner surface.

The invention also consists in other details of construction and combinations of parts, which will be hereinafter more fully described and claimed.

In the drawings forming a part of this specification, Figure 1 represents a side elevation of my improved wheel in its complete form. Fig. 2 is a section through the same, taken along the line of two diametrically opposite spokes. Fig. 3 is a detail perspective view of one part of the felly, showing the caps in the outer ends thereof. Fig. 4 is a detail view of one of said caps. Fig. 5 is a similar view of one of the setting-bolts. Fig. 6 is a detail perspective view of the inner part of the hub. Fig. 7 is a similar view of the outer part thereof. Fig. 8 is a similar view of the point-band or collar for holding the inner and outer parts of said hub in their closed positions. Fig. 9 is a detail view of a covering-clip for the adjacent ends of two parts of the felly.

Like reference-numbers indicate like parts in the different views.

My improved wheel when in its complete form is the same in appearance as a wheel of ordinary construction. The same is made up of a hub 1, consisting of the part 2, which is located adjacent to the wagon-box and has an outwardly-extending cone-shaped or tapering mandrel 3 thereon provided with longitudinal grooves 4 and having screw-threads 5 upon its outer end. The outer part 6 of said hub is bored out centrally, as shown at 7, so that it is adapted to fit upon the mandrel 3 when the two parts of the hub are in their closed positions. These parts are held in such closed positions by means of a point-band or collar 8, having internal screw-threads thereon which are adapted to engage the screw-threads 5 upon the outer end of the mandrel 3.

The spokes 9 of my wheel are of ordinary form and construction. The felly 10, however, is made up of a plurality of parts 11 11, the outer ends of each part having secured to them caps 12 12, with threaded openings 13 therein. Adapted to fit between the adjacent ends of two of the parts 11 of the felly are tire-setting bolts 14 14, each having right and left hand screw-threads upon its opposite ends, and a central head 15, by means of which it may be turned in one direction or the other. The threaded ends of said bolts engage the threaded openings 13 in the caps 12, so that when they are turned in one direction or the other the parts 11 of the felly are thrown outwardly or drawn inwardly. The outer surface of the felly 10 is convex, and the inner surface of the tire 16, which fits upon said felly, is concave. In other respects said tire is similar to the old form of construction. In order to prevent the entrance of mud or dirt between the adjacent ends of the two parts of the felly at their points of connection with one another, I may employ a covering-clip 17, as clearly shown in detail in Fig. 9.

In assembling the parts of my wheel the felly 10 is inserted upon the inside of the tire 17, with the convex portions of said felly fitting in the concave portions of said tire. The setting-bolts 14 are then turned, so that the parts 11 of the felly are expanded and fit closely to the inside of the tire. The outer ends of the spokes 9 are then inserted into suitable openings on the inside of the felly 10, and the lower ends of said spokes are fitted within the longitudinal grooves 4 in the mandrel 3 on the hub 1. The length of said spokes is such that normally and without the application of pressure upon the under side their lower ends will fit the outer ends of said mandrel. The part 6 of the hub is then placed upon the outer end of the mandrel and forced slightly inwardly, throwing the spokes 9 outwardly by reason of the inclined edges of the mandrel 3. When the part 6 has been seated, or even before it has reached its seat, the point-band or collar 8 may be applied to the outer end of the mandrel 3, with the threads on said point-band engaging the threads 5 on said mandrel. Upon screwing the band 8 to its extreme inner position the two parts 2 and 6 of the hub 1 and the lower ends of the spokes 9 are in close contact one with the other, and the two parts 11 of the felly are forced outwardly into close contact with the tire 16.

As thus constructed a wheel is produced which is extremely strong, cheap to manufacture, and one which does away with the necessity of shrinking the tire upon the felly.

Having now described my invention, what I claim as new, and desire to secure by Letters Patent, is—

1. In a wheel, the combination with the felly, the spokes and the tire, of a hub made up of an inner portion, having an outwardly-extending hollow tapering mandrel thereon provided with longitudinal grooves upon its outer surface and screw-threads upon its outer end, in which grooves the lower ends of said spokes are adapted to fit, an outer portion fitting upon said mandrel, and means for securing the outer portion of said hub in place, substantially as and for the purpose described.

2. In a wheel, the combination with the felly, the spokes and the tire, of the hub made up of an inner portion, having an outwardly-extending tapering mandrel thereon, provided with longitudinal grooves upon its outer surface and screw-threads upon its outer end in which grooves the lower ends of said spokes are adapted to fit, an outer portion adapted to fit upon said mandrel, and an internally-threaded point-band or collar adapted to engage the screw-threads upon the outer end of said mandrel, force the outer ends of said hub inwardly, and hold the parts of said hub and the spokes fitting between them, in close contact one with the other, substantially as and for the purpose described.

In testimony whereof I have signed this specification in the presence of two subscribing witnesses.

THOMAS T. JORDAN.

Witnesses:
J. S. NOLL,
E. C. DAILEY.